J. G. JARVIS.
METHOD OF MAKING PYROXYLIN PRODUCTS.
APPLICATION FILED MAR. 13, 1919. RENEWED JUNE 23, 1920.
1,351,652.
Patented Aug. 31, 1920.
2 SHEETS—SHEET 1.
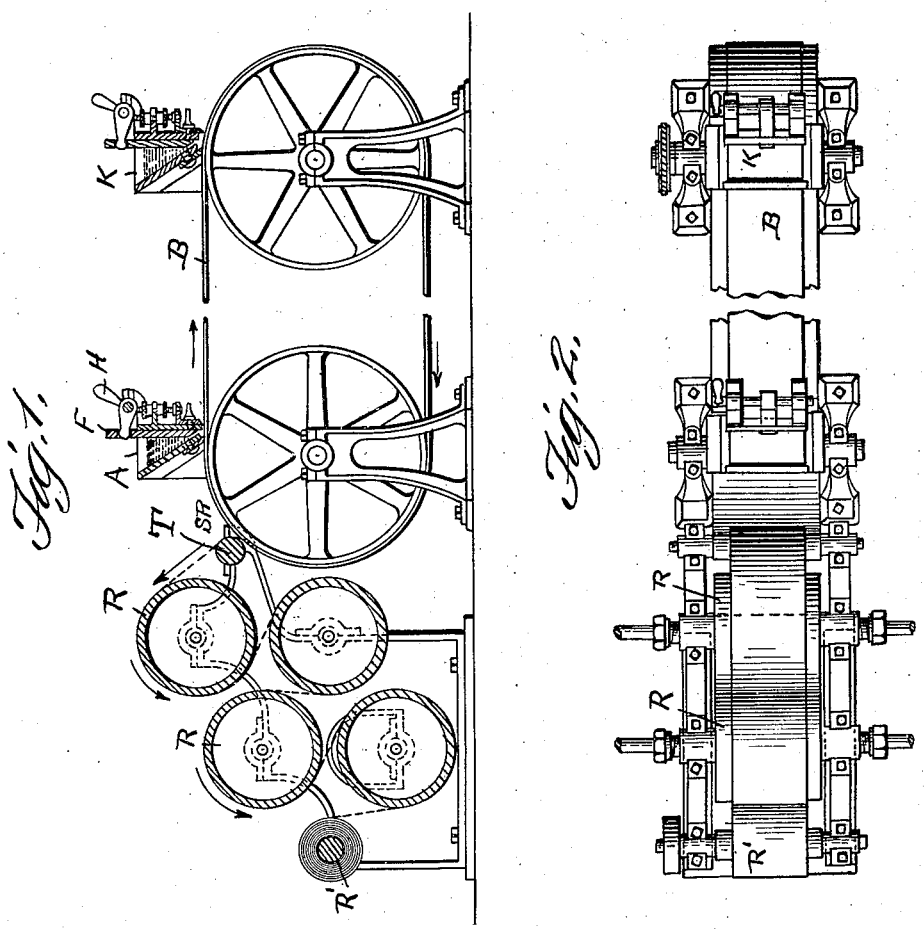

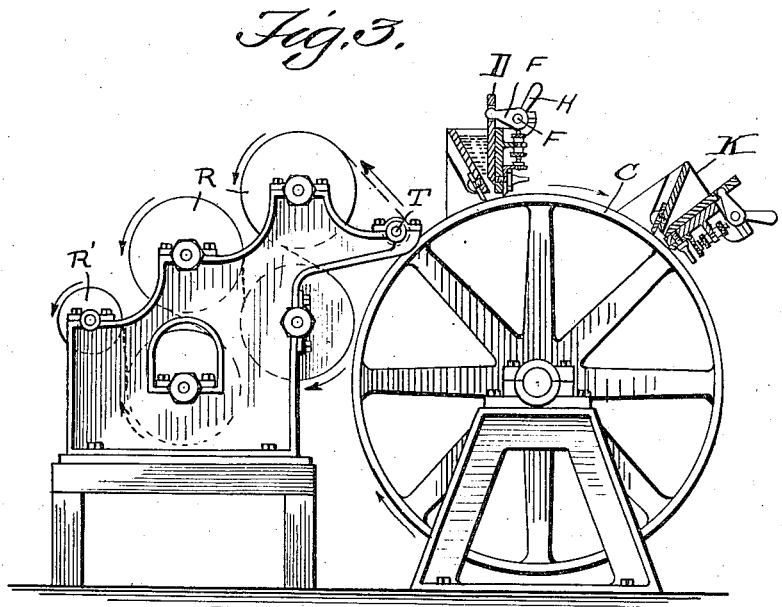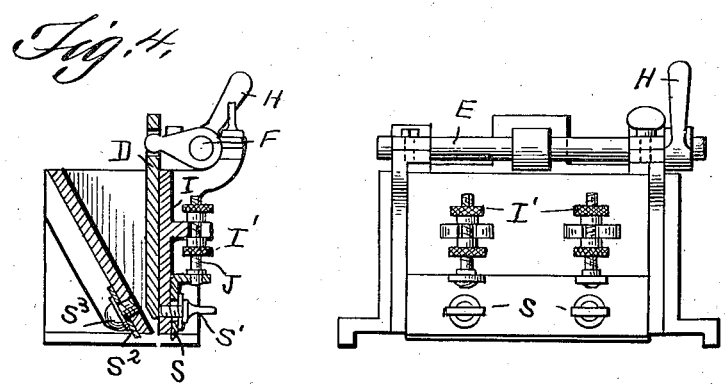

UNITED STATES PATENT OFFICE.

JOHN G. JARVIS, OF STAMFORD, NEW YORK.

METHOD OF MAKING PYROXYLIN PRODUCTS.

1,351,652.  Specification of Letters Patent.  Patented Aug. 31, 1920.

Application filed March 13, 1919, Serial No. 282,402. Renewed June 23, 1920. Serial No. 391,161.

*To all whom it may concern:*

Be it known that I, JOHN G. JARVIS, a citizen of the United States, residing at Stamford, in the county of Delaware and State of New York, have invented certain new and useful Improvements in Methods of Making Pyroxylin Products; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in method of making pyroxylin products, and consists in the provision of uniting two films into a homogeneous sheet by the provision of an apparatus, having various details of construction, combination and arrangement of parts which will be hereinafter fully described, shown in the accompanying drawings and then specifically defined in the appended claims.

I illustrate my apparatus in the accompanying drawings which, with the letters of reference marked thereon, form a part of this application, and in which:

Figure 1 is a side elevation partly in section.

Fig. 2 is a top plan view.

Fig. 3 is an elevation of a modified form of the apparatus.

Fig. 4 is a detailed sectional view through a hopper, and

Fig. 5 is a face view of the detail shown in Fig. 4.

Reference now being made to the details of the drawings by numerals:

In carrying out my process I make a solution by uniting acetyl cellulose and nitrocellulose with a mutual solvent, such as acetone or acetic ether, or other solvent of both the nitrocellulose and the acetyl cellulose. The solution thus produced is placed within a suitable hopper A, as shown in Figs. 1 and 3 of the drawings, which is used for spreading the pyroxylin compound upon the belt B, as shown in Fig. 1, or the surface of a wheel C, as shown in Fig. 3. Said hopper has an adjustable gate D, the lower end of which regulates the size of the exit opening from the hopper, and E designates a rock shaft to which a gate moving member F is fixed, said shaft being given a rocking movement through the medium of the handle H, details of which gate are shown in Figs. 4 and 5 of the drawings. The side I of the hopper is held in different adjusted positions through the medium of the nuts I' mounted upon the screws J.

The thickness of the deposit of the solution permitted to make exit from the hopper upon the belt or wheel is regulated by a scraper S, so constructed that its distance from the belt may be varied and held in its adjusted position by means of a screw S', shown clearly in Fig. 4 of the drawings. A scraper S² is composed of rigid material and is held by means of a screw S³ to the inclined side of the hopper, and preferably of a softer material than the surface of the belt or wheel, and provided to avoid abrasion and wipes against the belt or wheel so as to prevent the spreading of the solution.

T designates a stripping roll for stripping the pyroxylin sheet from the belt or wheel, and from whence the two sheets, which are to be made into a homogeneous mass, are adapted to pass over the drying rolls R which are preferably of a smooth, polished material and capable of being heated or cooled in any suitable manner, not shown.

A suitable winding roll R' is mounted in bearings in the frame supporting the drying rolls and about which the composite sheet, made up of the two solutions reduced to a homogeneous mass, is adapted to be wound.

Within the hopper K, shown as applied in Fig. 1 to a belt, or in the form Fig. 3 as applied to the wheel, a solution formed by uniting acetyl cellulose and naphthalin in suitable proportions, such as 90% of the former to 10% of the latter, and to which is added a mixture of equal parts of acetone and acetic ether sufficiently to thoroughly dissolve the mixture into a liquid, after which a solution of acetone collodion made up of 1 ounce of nitro cellulose to 8 fluid ounces of acetone is added to the mixture.

To the foregoing composition I add a solution of chloral hydrate or anhydrous chloral (made of 200 cubic centimeters of acetone, to 20 grams of chloral hydrate); also to 90 parts of this mixture of acetone and chloral hydrate I add 10 parts cinchonin or cinchonin sulfate.

The first solution in the above described method is permitted to be coated upon the belt or the surface of the wheel traveling in the direction of the arrow (Figs. 1 and 3), but by the time it reaches the hopper K, the same becomes partially dry and upon its surface as it passes underneath the hopper, the second solution is applied to the same, and passing about the belt or wheel they become united into a homogeneous mass and pass about the roller T and the drying rolls R, from which they are wound upon the winding roll R'.

By the first coating of the film nitrocellulose and acetyl cellulose are used with a mixture of chloral hydrate and cinchonin sulfate in about equal proportions, the object of which is to reduce the inflammability of the film. By the second coating of the film a larger quantity of the cellulose than the acetyl cellulose is used with a smaller proportion of the chloral hydrate and cinchonin sulfate. This combination makes a very tough strong film of reduced inflammability.

What I claim to be new is:

1. A method of making pyroxylin products consisting of a spreading mixture made of nitrocellulose and acetyl cellulose united by a mutual solvent when in a soft state upon a carrier, afterward spreading upon the soft surface a fluid mixture made of acetyl cellulose and naphthalene in suitable proportions, together with equal parts of acetone and acetic ether and to which a solution of acetone and collodion is added and when in a homogeneous state a solution such as chloral hydrate is added to reduce the inflammability of the film.

2. A method of making pyroxylin products consisting of a spreading mixture made up of nitrocellulose and acetyl cellulose united by a mutual solvent when in a soft state upon a carrier, afterward spreading upon the soft surface a fluid mixture made of acetyl cellulose and naphthalene in suitable proportions, together with equal parts of acetone and acetic ether and to which a solution of acetone and collodion is added and when in a homogeneous state a solution such as chloral hydrate, and afterward adding an alkaloid such as a cinchonin and its salts.

In testimony whereof I hereunto affix my signature in presence of two witnesses.

JOHN G. JARVIS.

Witnesses:
F. J. R. CLARKE,
LILLIAN A. WOLF.